United States Patent [19]

Brown

[11] 4,094,589

[45] June 13, 1978

[54] DATA VIEWER

[76] Inventor: George J. Brown, 22 Grandview Ave., Waterbury, Conn. 06708

[21] Appl. No.: 671,109

[22] Filed: Mar. 29, 1976

[51] Int. Cl.² .............. G09F 11/24; G02B 27/02; G03B 21/00
[52] U.S. Cl. .................................... 350/241; 40/361; 353/31; 353/42
[58] Field of Search ............... 350/239, 241, 247; 40/86 A; 200/153 J; 353/42, 27, 35, 31

[56] References Cited

U.S. PATENT DOCUMENTS

| | | | |
|---|---|---|---|
| 1,833,595 | 11/1931 | Samson et al. | 40/86 A |
| 2,548,488 | 4/1951 | Mella | 40/86 A |
| 2,619,870 | 12/1952 | Toricelli | 350/239 |
| 3,191,490 | 6/1965 | Rabinow | 353/101 |
| 3,195,402 | 7/1965 | Hamilton | 353/42 |
| 3,343,452 | 9/1967 | Ackermann et al. | 353/42 |
| 3,436,983 | 4/1969 | Krantz | 200/153 J |
| 3,563,645 | 2/1971 | Burke et al. | 353/27 R |
| 3,914,570 | 10/1975 | Lockard | 200/153 J |
| 3,992,088 | 11/1976 | Blanke | 353/26 R |

Primary Examiner—Steven L. Stephan
Attorney, Agent, or Firm—McCormick, Paulding & Huber

[57] ABSTRACT

A viewer has a telescopic housing and includes a lens system carried by one housing part and a plurality of correlated information sources supported by another housing part and arranged serially along the optical axis of the lens system in a plurality of focal planes. At least one of the information sources comprises a transparency which has data thereon and is disposed between the lens system and another of the information sources. When the lens system is focused on the one information source the other of the information sources are out of the field of focus of the system whereby data on any one of the information sources may be viewed to the selective exclusion of data on the other of the information sources. Color filters associated with the lens system may be employed to view portions of data on any one information source to the exclusion of other data thereon.

26 Claims, 28 Drawing Figures

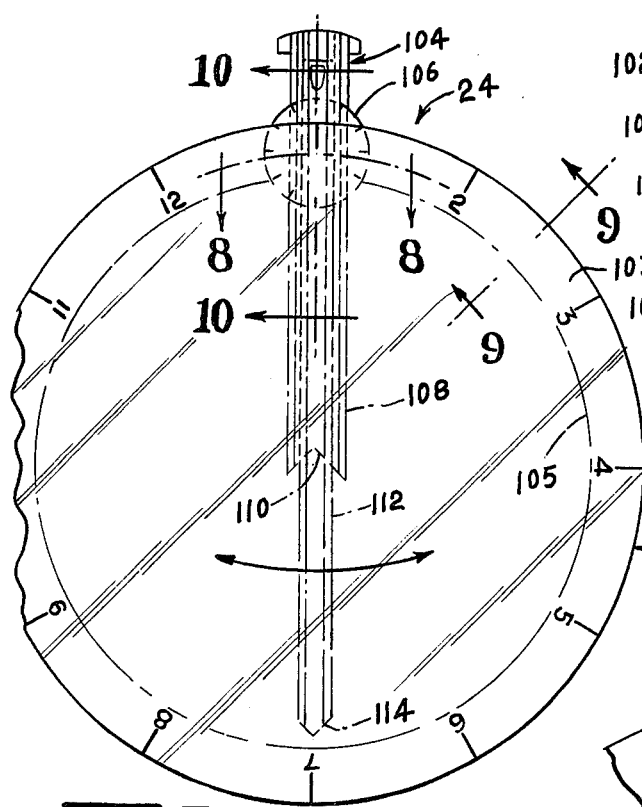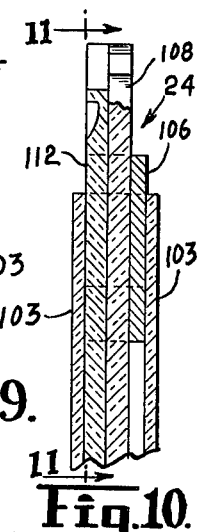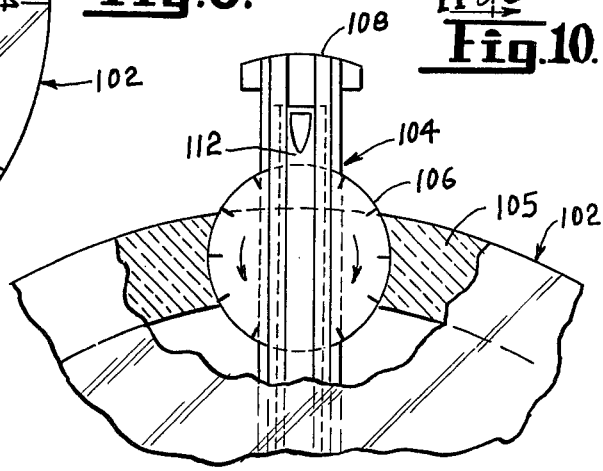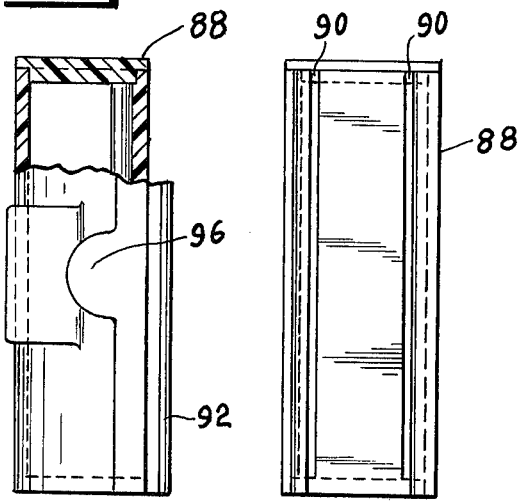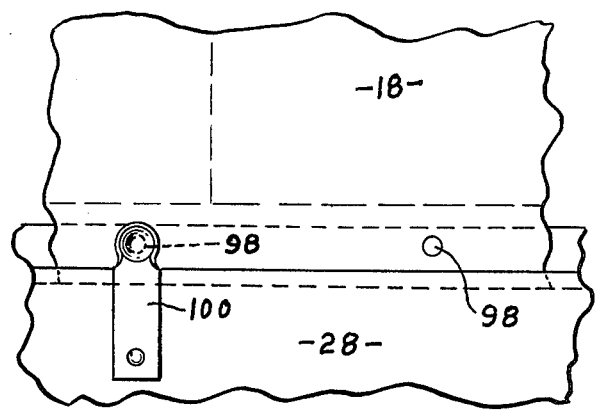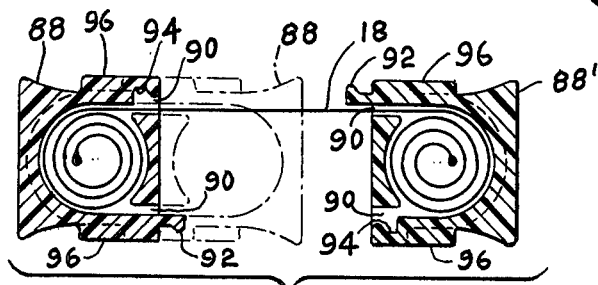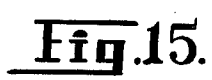

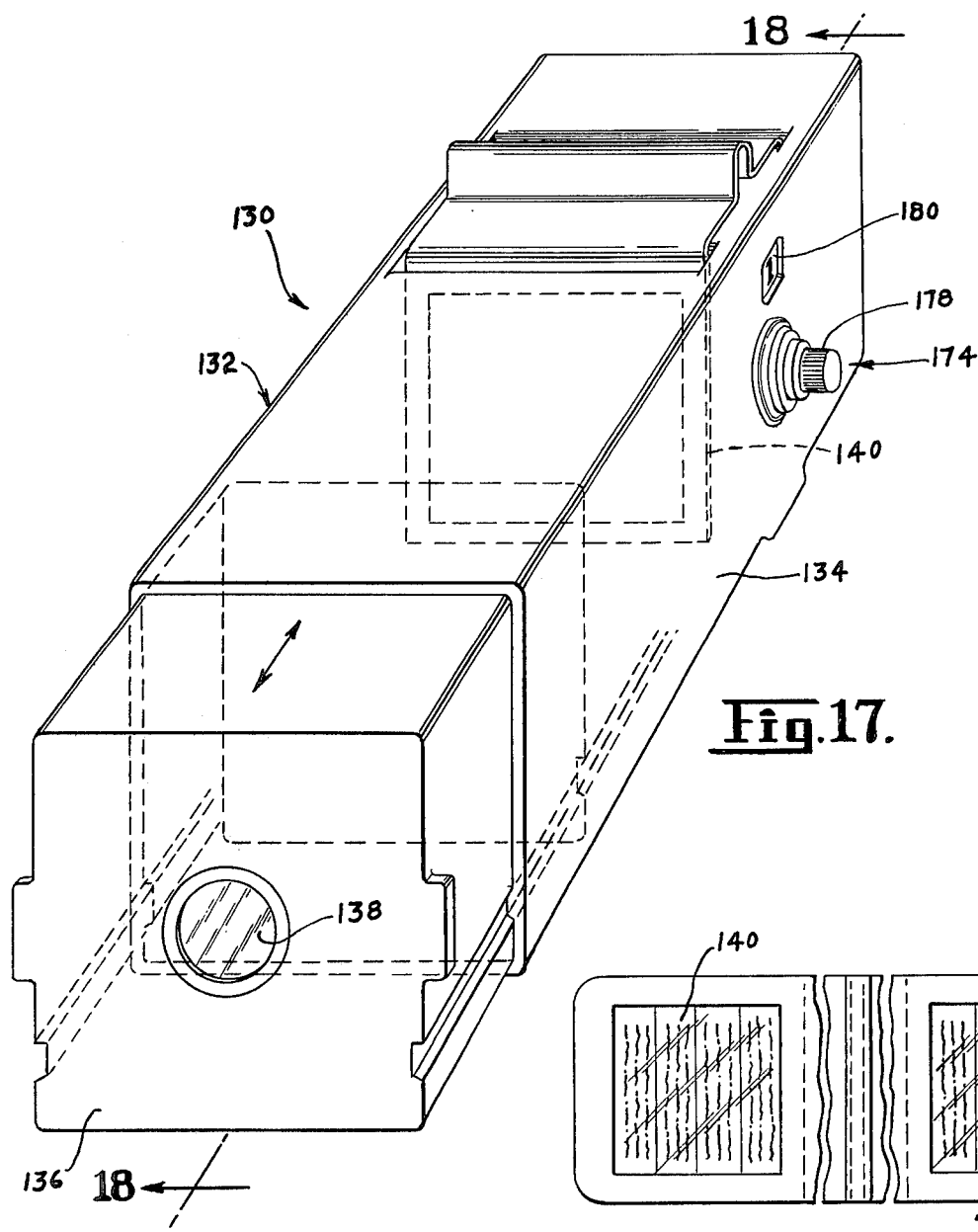
Fig.17.
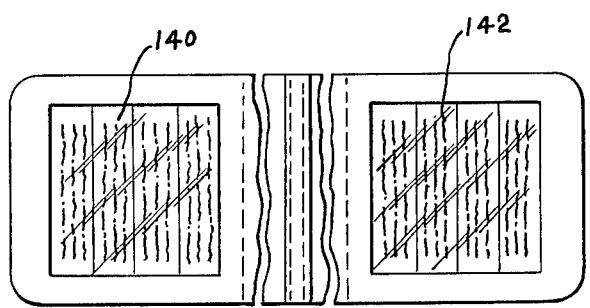
Fig.19.
Fig.20.
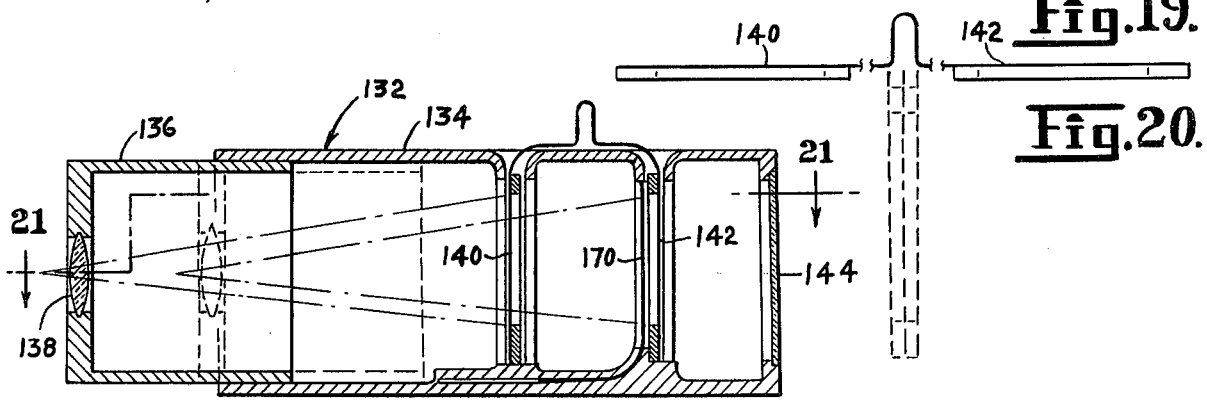
Fig.18.

DATA VIEWER

BACKGROUND OF THE INVENTION

This invention relates in general to viewers and deals more particularly with improved viewers for reading correlated data from a plurality of information sources.

Heretofore, method and apparatus have been provided to facilitate the reading of data from a plurality of related information sources wherein at least one of the sources comprises a transparency having data imprinted thereon. Systems of the aforedescribed type are useful for reading maps, charts and the like and may employ at least one transparent informaton source superimposed upon or arranged in overlying relation with another information source whereby the data on both information sources may be simultaneously viewed. Typical apparatus of the aforedescribed type is illustrated in U.S. Pat. No. 3,094,781 to Vangor for Course Finder, issued June 23, 1963. However, when one data source is superimposed upon another for simultaneously viewing confusion may occur, particularly if either or both of the information sources contain a substantial amount of data some of which is not of immediate interest to the viewer. A typical situation of this type is encountered in map reading where the reader is interested only in selected information as, for example, a route from a starting point to the destination. All other information on the map is of no immediate interest to the reader and may only serve to confuse him.

It is the general aim of the present invention to provide improved data reading viewers whereby selected data carried by a plurality of correlated information sources may be readily viewed to the exclusion of other data on the information sources, but not of immediate interest. The data reading viewers of the present invention facilitate map reading and may prove particularly useful in dispatching utility workers or the like to designated destinations. Detailed data relating to a destination, as for example, specific locations of utility lines at the destination, may be selectively viewed by the worker in relation to other pertinent data when the worker arrives at his assigned destination. However, it will be evident from the disclosure which follows that the method and viewer of the present invention may have other uses and may, for example, serve as a toy or be used as a teaching aid to permit questions and answers to be rapidly selectively viewed in relation to each other.

SUMMARY OF THE INVENTION

A viewer is provided for reading data from a plurality of correlated information sources, at least one of which comprises a transparency, such as a photographic film slide, by arranging the information sources serially along the optical axis of a lens system and in a plurality of focal planes normal to the optical axis. The transparency is positioned intermediate the lens system and another of the information sources. Each focal plane is outside the focal range of the other, whereby data on any one of the information sources may be viewed to the exclusion of data on the other of the sources. One of the information sources has data imprinted thereon in one translucent color and another of the information sources has data imprinted thereon in another translucent color, the one and the other color being additive colors. The viewer includes a housing having a plurality of parts. The lens system is carried by one housing part which is movable toward and away from another housing part which supports the information sources.

BRIEF DESCRIPTION OF THE DRAWINGS

FIG. 7 is a front elevational view of the pointer assembly shown removed from the viewer.

FIG. 8 is a fragmentary sectional view taken along the line 8—8 of FIG. 7.

FIG. 9 is a fragmentary sectional view taken along the line 9—9 of FIG. 7.

FIG. 10 is a fragmentary sectional view taken along the line 10—10 of FIG. 7.

FIG. 11 is a somewhat enlarged fragmentary elevational view of the pointer assembly of FIG. 7 shown partially in section taken along the line 11—11 of FIG. 10.

FIG. 12 is an elevational view of a film cartridge shown partially in vertical section.

FIG. 13 is an elevational view of the inner end of the cartridge of FIG. 12.

FIG. 14 is a horizontal sectional view through a cartridge assembly shown with a film strip therein and illustrates the manner in which two substantially identical film cartridges which comprise the assembly cooperate to provide a container for a film strip.

FIG. 15 is a somewhat enlarged fragmentary sectional view taken along the line 15—15 of FIG. 3.

FIG. 17 is a somewhat schematic perspective view of another viewer embodying the present invention.

FIG. 18 is a schematic sectional view taken along the line 18, 18 of FIG. 17.

FIG. 19 is a plan view of a transparent slide assembly.

FIG. 20 is a side elevational view of the slide assembly of FIG. 19, the storage position of the assembly being indicated by broken lines.

DETAILED DESCRIPTION OF THE PREFERRED EMBODIMENTS

Figure 3:
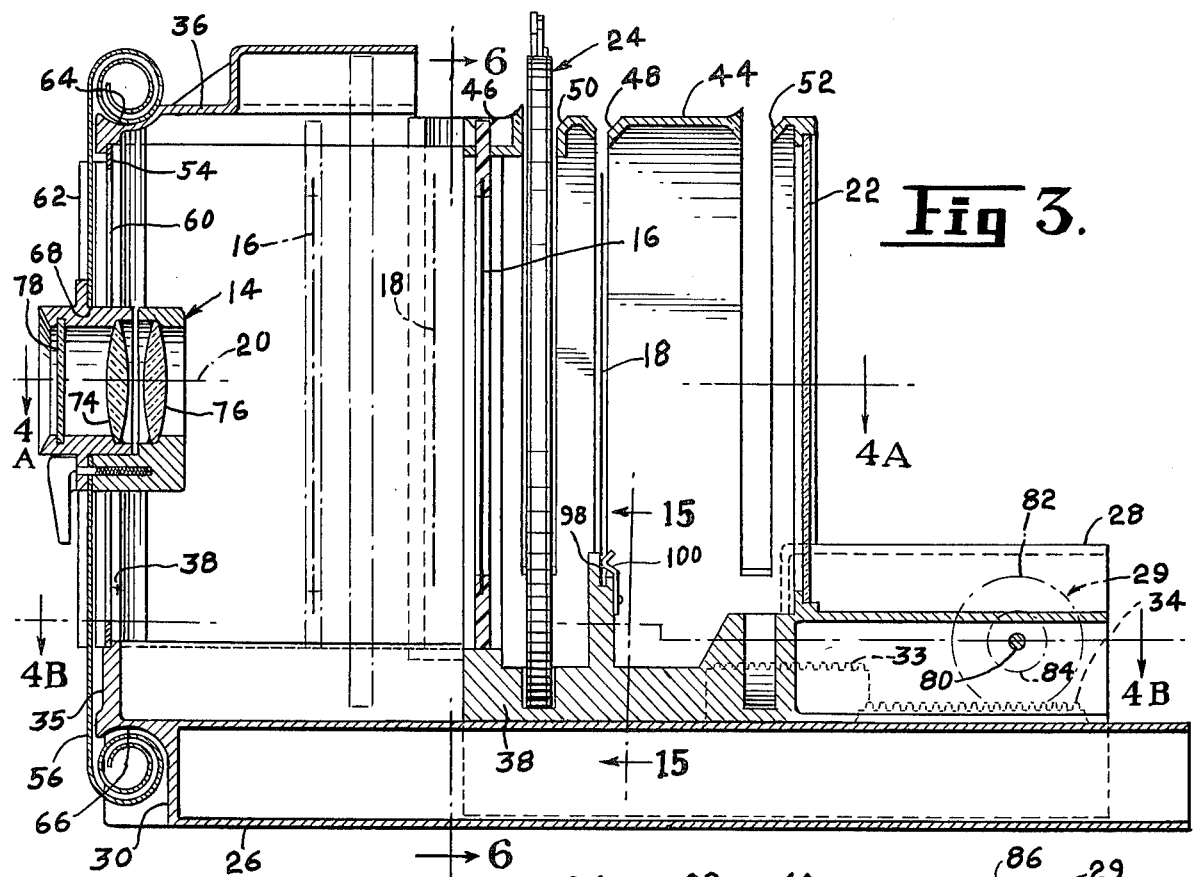
FIG. 3 is a side elevational view of the viewer of FIG. 1 shown in longitudinal section.
Figure 4:
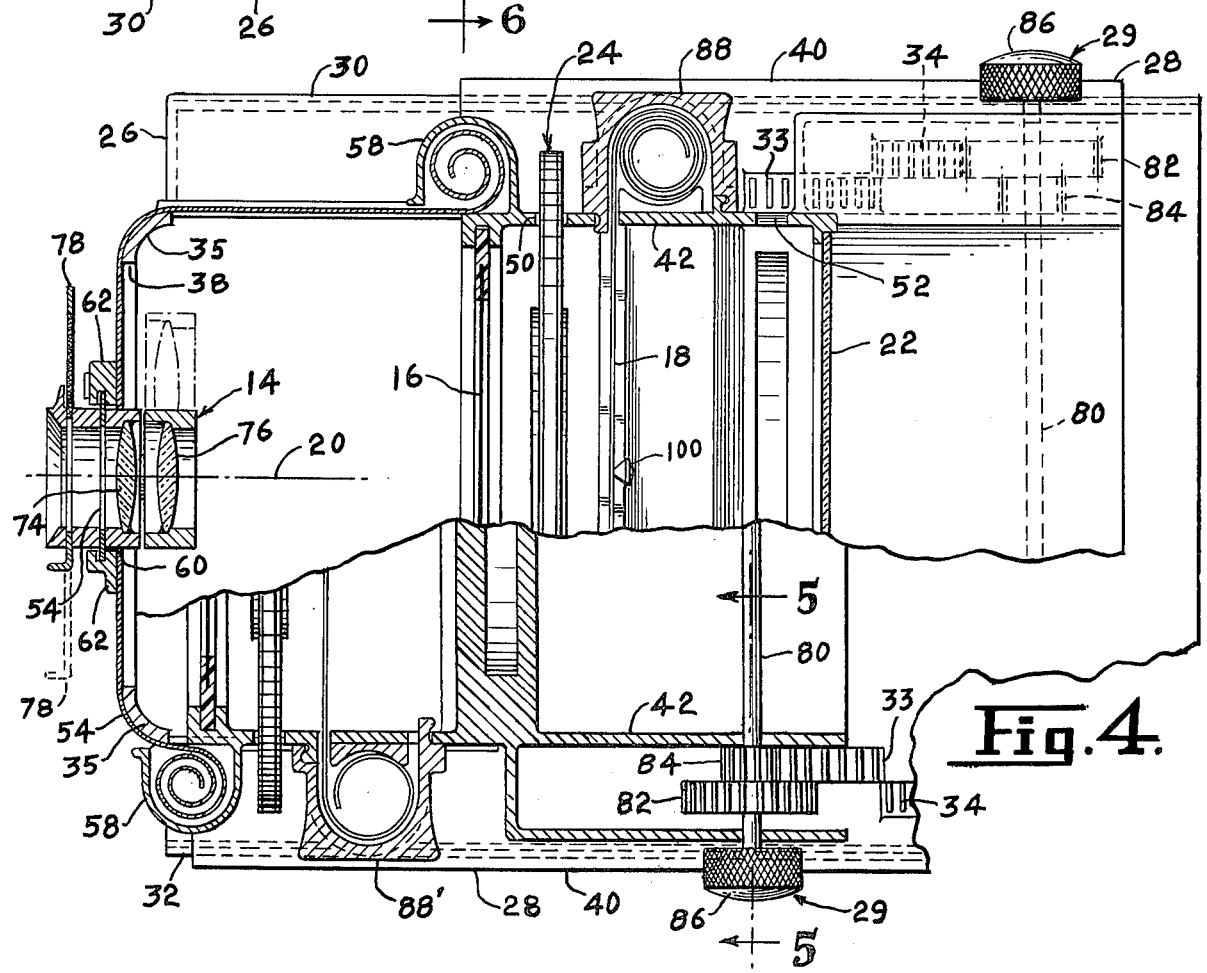
FIG. 4 is a sectional view through the viewer of FIG. 1, the upper portion of the section being taken along the line 4A—4A, and the lower portion of the section being taken along the line 4B—4B of FIG. 3.

Turning now to the drawings and referring first particularly to FIGS. 1-6, a viewer embodying the invention is designated generally by the numeral 10. The viewer 10 has a housing indicated generally at 12 and supporting a lens system 14 for selective focusing on any one of a plurality of information sources such as indicated at 16 and 18 having corelated data thereon. The information sources 16 and 18 are supported in the housing serially along the optical axis or line of the sight of the lens system 14 in a plurality of individual focal planes and generally normal to the optical axis, as best shown in FIGS. 3 and 4, the line of sight being indicated by the numeral 20. At least one of the information sources is transparent and positioned between the lens system 14 and another of the information sources. However, in the illustrated embodiment 10 both information sources 16 and 18 are transparent and illuminated by light which enters the housing through a translucent defusion plate 22 made from frosted glass or plastic and mounted in the rear of the housing. When the lens system 14 is focused on one of the information sources, the other of the information sources is outside of the field of focus of the lens system. Thus, when the lens system is focused on the information source 16, data thereon may be viewed to the exclusion of data on the information source 18. However, when the lens system is focused on the information source 18, the latter source may be viewed through the transparent source 16 to the exclusion of data on the source 16, which is then out of the field of focus of the lens system 14. The viewer 10 also includes an optional pointer assembly, indicated generally at 24 and which may be received and supported in the housing in at least one position near an associated one of the information sources and generally within the field of focus thereof. A movable pointer which comprises a part of the pointer assembly 24 may be selectively positioned and viewed together with data on the latter source, as will be hereinafter more fully explained.

Considering now the viewer 10 in further detail, the housing 12 includes a front part 26 which carried the lens system 14 and a rear part 28 which supports the information sources 16 and 18 and the pointer assembly 24. A rack and pinion mechanism indicated generally at 29 is provided for moving the rear part 28 relative to the front part 26 and toward and away from the lens system 14 to facilitate selective focusing of the lens system on one or the other of the information sources 16 and 18. More specifically, the front part 26 has a base 30 which includes a pair of grooved ways 32, 32 extending along opposite sides thereof. Each way 32 has a pair of upwardly facing vertically spaced racks 33 and 34 formed thereon and best shown in FIGS. 3 and 4. A front wall 35 extends upwardly from the base and supports a top wall 36 which extends for some distance rearwardly of the front wall. A relatively large rectangular opening 38 in the front wall communicates with the interior of the housing.

Figure 1:
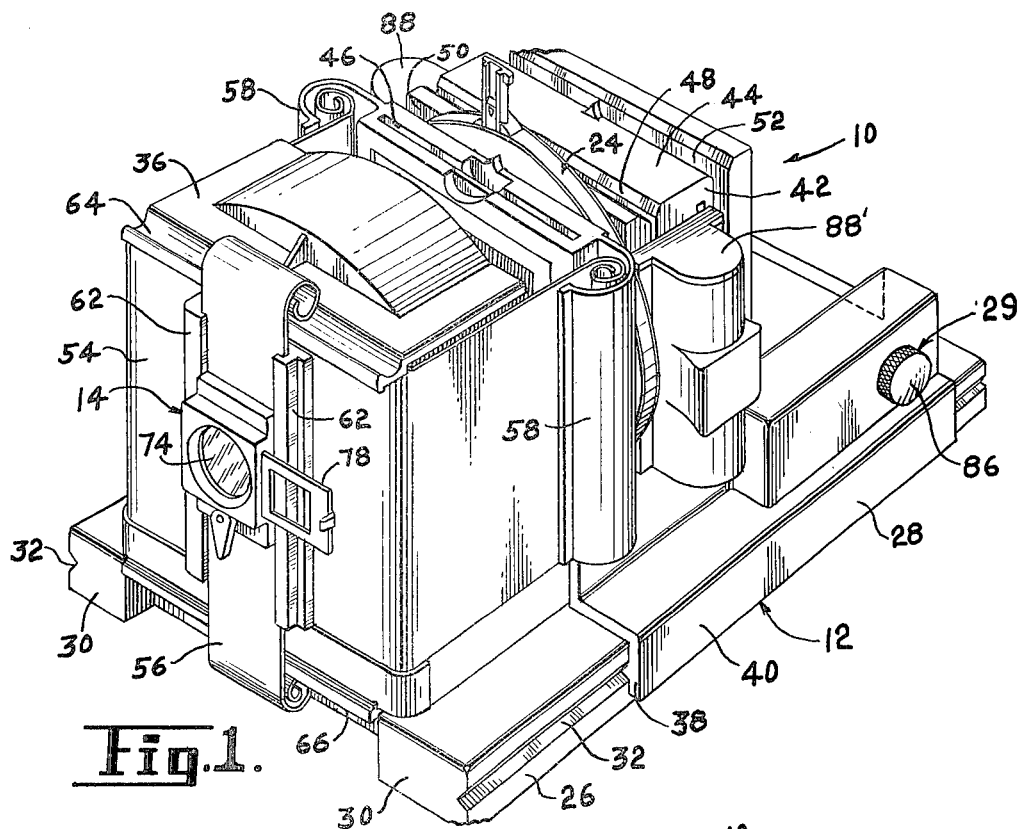
FIG. 1 is a perspective view of a viewer embodying the present invention.
Figure 2:
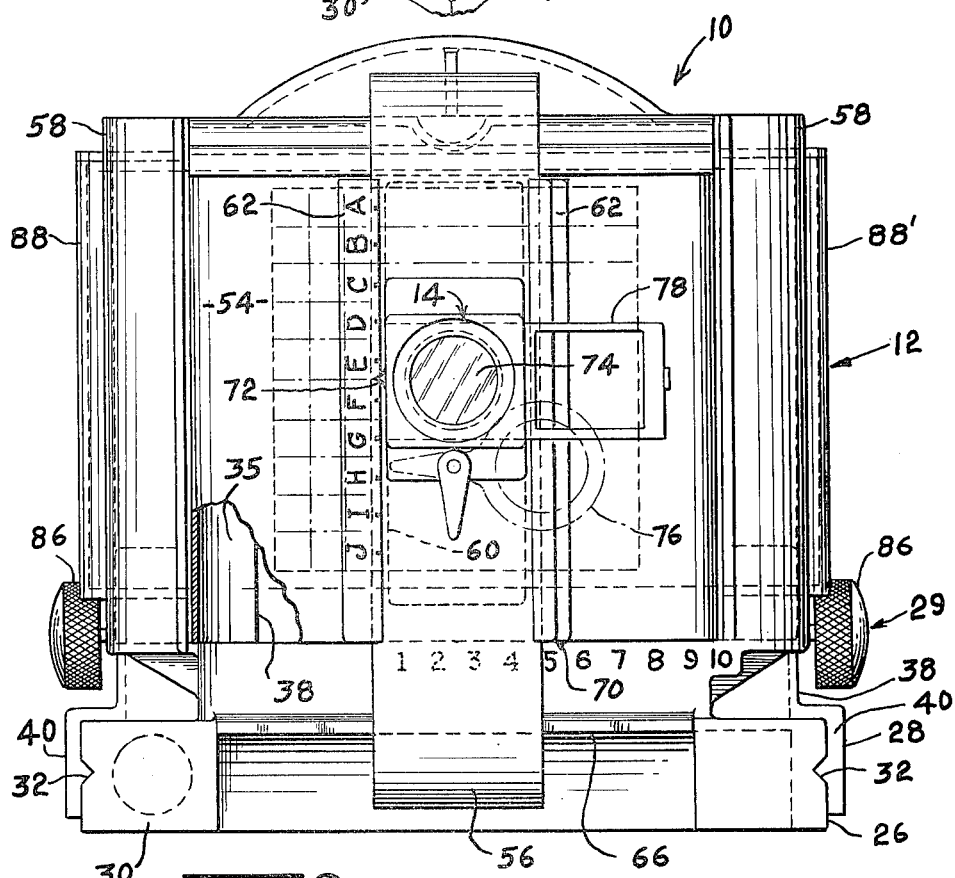
FIG. 2 is a front elevational view of the view of FIG. 1.

The rear part 28 is telescopically connected to the front part 26 and includes a base portion 38 which has a pair of opposed inwardly facing slides 40, 40 at opposite sides thereof respectively engaging the ways 32, 32 to support the rear part for sliding movement on the front part 26 and toward and away from the lens system 14. Side walls 42, 42, extend upwardly from the base 38 and terminate at a top wall 44. The information source 16, which, as shown, comprises a transparent film slide, is received and supported in an upwardly opening slot 46 formed in the top wall 44 and the side walls 42, 42. Another upwardly opening slot 48 defined by the top and side walls receives and supports the information source 18, which, in the illustrated case, comprises a transparent film strip. Additional slots 50 and 52 formed in the top and side walls of the rear part 28 and best shown in FIGS. 1 and 3 are provided to receive and support the pointer assembly 24 in either of two alternate positions in the housing.

The lens system 14 is supported on the front part 26 for movement relative thereto by strips of resilient material 54 and 56, which may, for example, comprise strips of resiliently coiled flat metal, plastic or the like. The strip 54 extends across the front wall 35 and rearwardly along opposite sides of the front part 26 and has resiliently coiled end portions each of which is received in a respectively associated forwardly opening receptacle 58 on the rear part 28 integrally formed on an associated side wall 42 as best shown in FIGS. 1 and 4. Each receptacle 58 generally complements an associated coiled end portion of the strip 54. Thus, the strip 54 provides a substantial closure for the frontal opening 38 and forms side wall of variable length of the front portion 26. An elongated vertically extending opening 60 is formed in the strip 54. A pair of vertically disposed inwardly opening tracks 62, 62 mounted on the front surface of the strip 54 and extends along opposite sides of the opening 60. The strip 56 is received in the tracks 62, 62 and extends vertically across the strip 54 to provide a substantial closure for the opening 60. The coiled upper end portion of the resilient strip 56 is received in a transversely extending arcuate groove 64 formed in the top wall 36 whereas the lower coiled end of the strip 56 is received in a similar transversely extending arcuate groove 66 formed in the base 30, as best shown in FIG. 3. The strip 56 has an opening 68 therethrough in vertical registry with the opening 60. The lens system 14 is mounted on the front surface of the strip 56 and extends through the openings 68, 60 and 38 and into the housing. It will now be evident that the lens system 14 is supported on the housing for movement relative thereto in both horizontal and vertical directions, the strip 54 providing for horizontal movement and the strip 56 providing for vertical movement of the lens system 14. Indicia of horizontal coordinate position imprinted on the base 30 and indicated by numerals 1-10 in FIG. 2 cooperate with an indicator 70 on one track 62, substantially as shown. Indicia of vertical coordinate position imprinted on the other track 62 and indicated by letters A-J in FIG. 2 to cooperate with a position indicator 72 on the lens system 14.

The lens system 14 may take various forms, but preferably and as shown it comprises a lens 74 which has a fixed focal length. The illustrated lens system 14 preferably includes another lens 76 supported for pivotal movement between active and inactive positions respectively indicated by full and broken lines in FIGS. 2 and 4. In its active position, the lens 76 cooperates with the lens 74 to shorten the focal length of the lens system 14 and effectively increase its magnification. The illustrated lens system 14 also includes at least one color filter 78 movable between active and inactive positions relative to the lens 74, as indicated by full and broken lines in FIG. 4.

The rack and pinion mechanism 29 comprises a shaft 80 journalled on the rear part 28 and extending transversely therethrough. The shaft 80 carries a pair of large pinions 82, 82 for repectively engaging the racks 34, 34 and a pair of somewhat smaller pinions 84, 84 for respectively engaging the racks 33, 33. Knurled knobs 86, 86 secured to opposite ends of the shaft 80 facilitate rotation of the shaft to move the rear part 28 toward and away from the lens system 14.

The illustrated information source 16 comprises a conventional transparency or film slide mounted in rectangular frame and adapted to be received in the slot 46. The information source 18 comprises a resiliently coiled filmstrip which has information thereon related to the information on the slide 16. The resiliently coiled end portion of the filmstrip 18 are received in film cartridges 88 and 88' releasably retained on opposite side walls 42, 42 of the viewer housing, as best shown in FIG. 4. Considering a tyical film cartridge 88 in further detail and referring particularly to FIGS. 12-14, the illustrated cartridge is made from resilient plastic material and has a generally cylindrical chamber for receiving a resiliently coiled end portion of the filmstrip 18 which enters the chamber through one of a pair of slots 90, 90, as shown in FIG. 14. A cartridge 88 further includes a locking tab 92 and a substantially complementary locking recess 94, adapted for complementary interlocking engagement with an associated locking tab and locking recess on a sidewall of the housing 42, as best shown in FIG. 4. A pair of substantially identical film cartridges 88, 88' comprise a cartridge assembly for supporting the filmstrip 18 on the viewer housing and within the slot 48. The cartridges 88, 88' are arranged to snap into interlocking engagement with the housing sides 42, 42. A cartridge 88 may be released from engagement with the housing by applying squeezing pressure to finger grips 96, 96 at opposite sides thereof to release the locking or retaining tab 92 from an associated locking or retaining recess in the housing wall. The cartridges 88 and 88' which comprise a cartridge assembly may also be joined together in interlocking relation with each other to provide a substantially sealed filmstrip container as shown in FIG. 14, the cartridge 88' being indicated by broken lines. Preferably, and as best shown in FIGS. 3 and 15 the filmstrip 18 has a series of apertures 98, 98 along one marginal edge thereof for cooperating with detent spring 100 mounted on the housing to releasably retain the filmstrip 18 in a plurality of selected positions wherein material on the filmstrip is oriented with respect to material on an associated slide 16, as will hereinafter further discussed.

Figure 5:
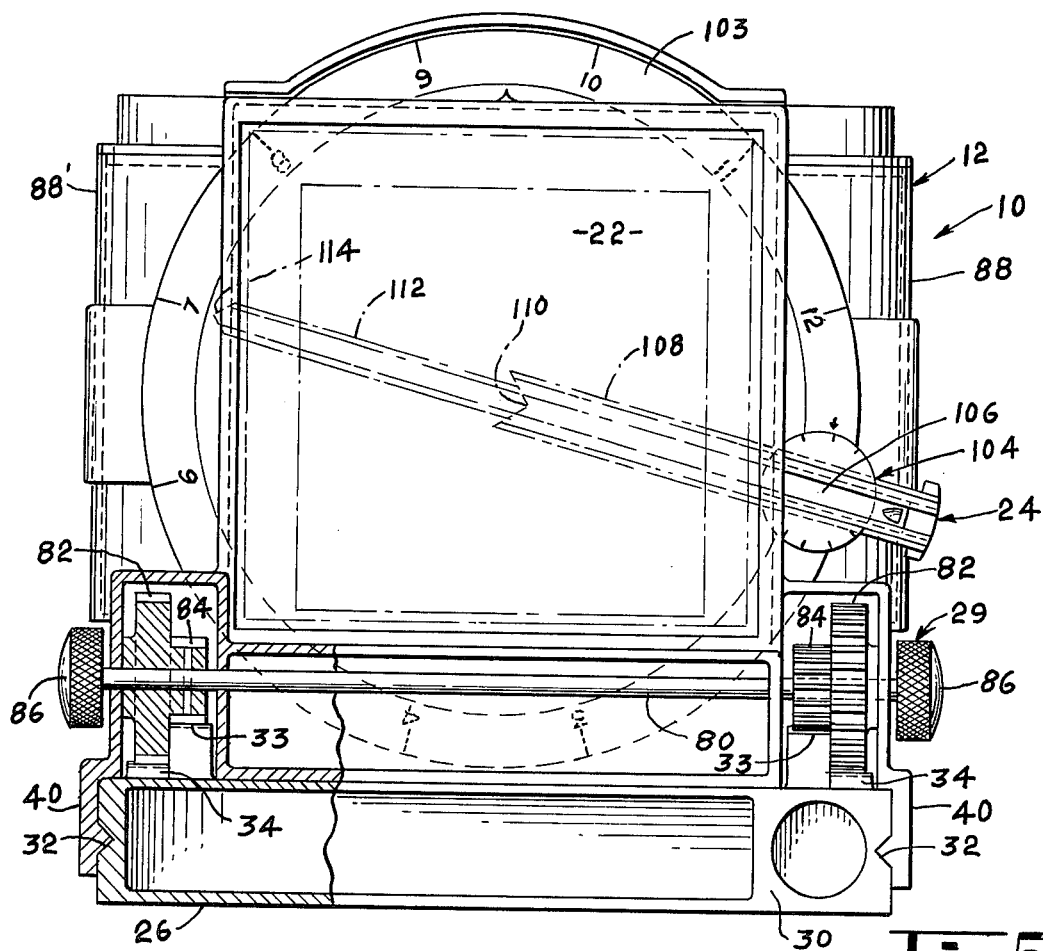
FIG. 5 is a rear elevational view of the viewer of FIG. 1 shown partially in section taken along the line 5—5 of FIG. 4.

The pointer assembly 24 generally comprises a transparent disc 102 supported for rotation about a central axis relative to the housing and generally parallel to the optical axis 20. The disc 102 is formed by a pair of circular plates 103, 103 made from transparent plastic and separated by a transparent annular member 105. A pointer indicated generally at 104 is sandwiched between the plates 103, 103 and supported on the disc 102 for limited pivotal movement about an axis 106 near the peripheral edge of the disc and parallel to the disc axis. The pointer includes an outer part 108 which has a pointer 110 formed at one end thereof and another part 112 supported by the part 108 for longitudinal sliding movement. The other part 112 has a pointer 114 at its free end. The pointer parts 108 and 112 are movable relative to the disc 102 and relative to each other so that the end pointers 110 and 114 may be positioned at various locations along a straight line and relative to the disc 102. Indicia of angular position on the disc and on the pointer support, as best shown in FIG. 5, facilitates predetermined positioning of the disc relative to the viewer 10 and further predetermined positioning of the pointer relative to the disc, for a purpose which will be hereinafter discussed.

Figure 6:
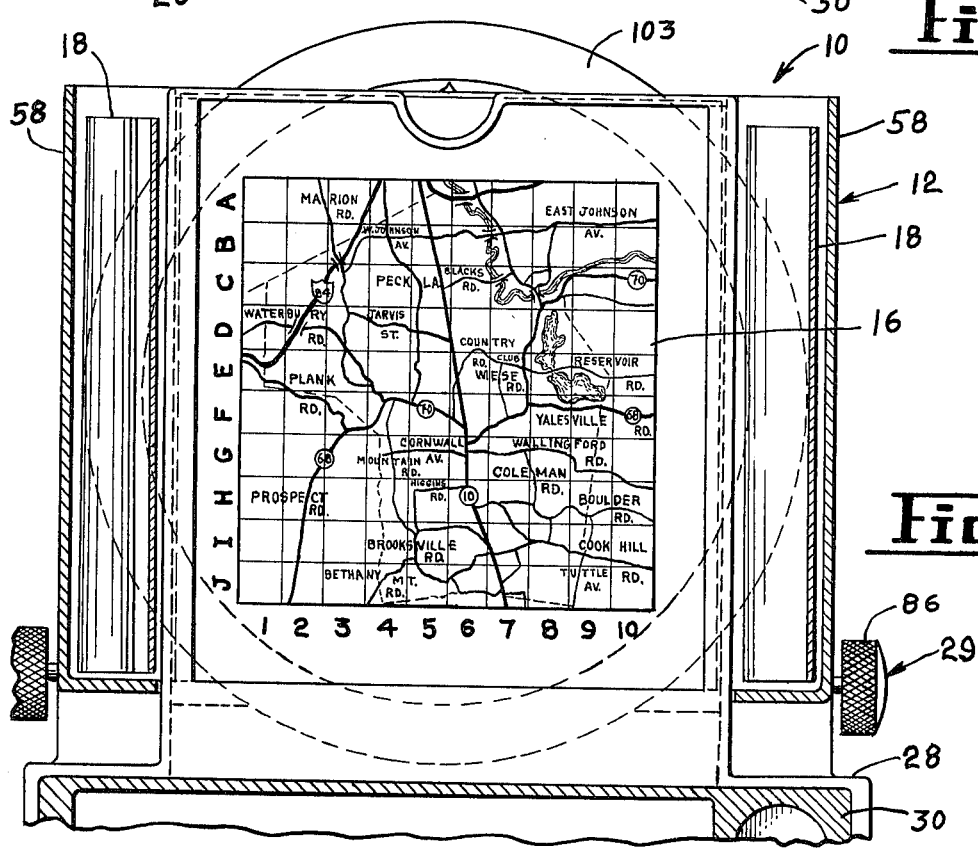
FIG. 6 is a fragmentary sectional view taken along the line 6—6 of FIG. 3.
Figure 16:
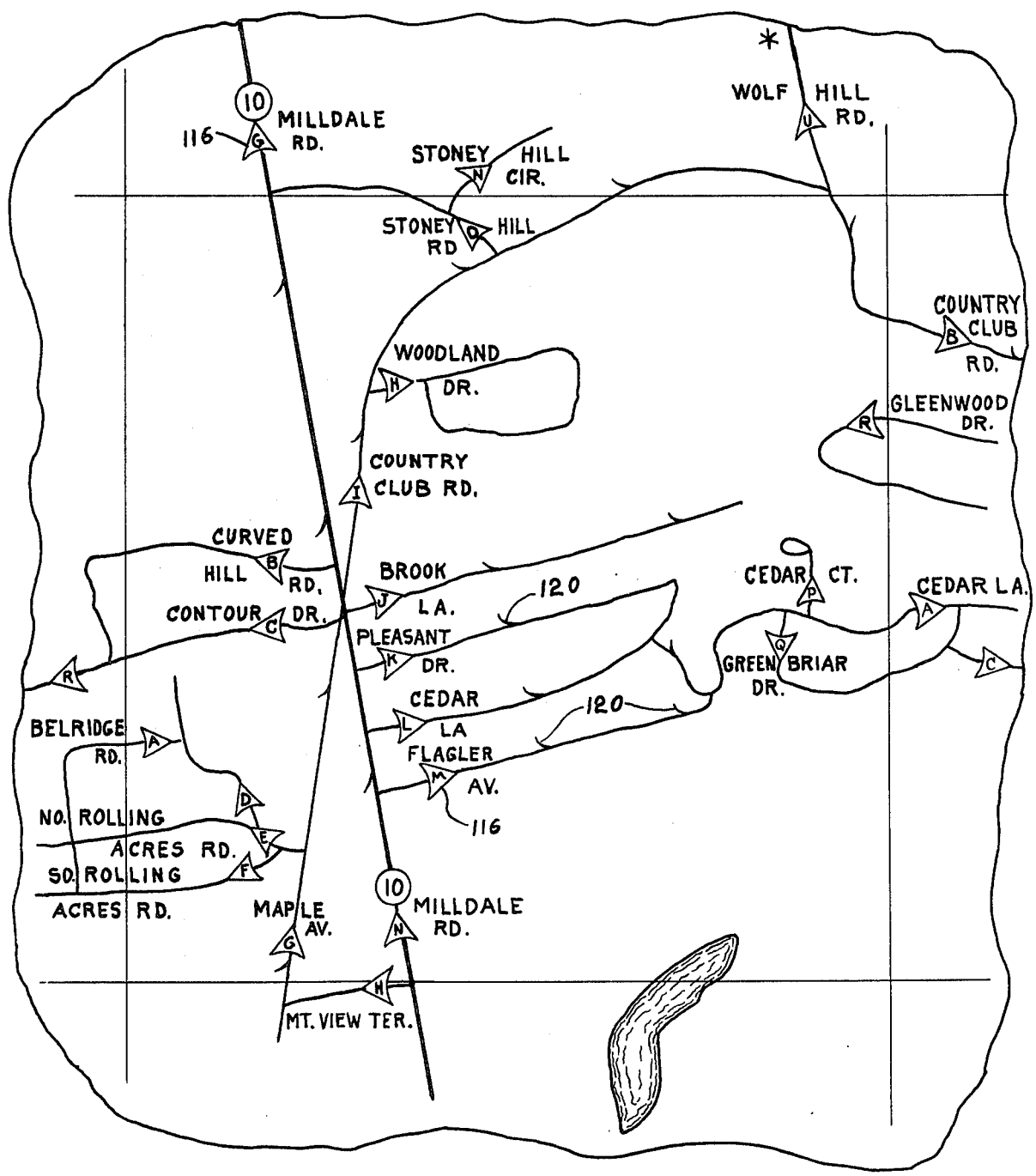
FIG. 16 is a somewhat enlarged fragmentary plan view of a data source or map for use with the viewer of FIG. 1.

In the illustrated embodiment the transparency or slide 16 comprises a typical information source and has a map imprinted thereon, such as may be used in dispatching a utility worker to a designated destination. The map, best shown in FIGS. 6 and 16 is divided into a plurality of sections indicated by vertical and horizontal coordinates designated, respectively, by letters A–J and numerals 1–10. In FIG. 16 an enlarged section of the map is shown and corresponds to the section designated by coordinates E-6. Referring to the map as shown in FIG. 6 the various Federal and State highways are identified by conventional symbols, substantially as shown. To further aid in dispatching, each street, as shown on FIG. 16 is also designated by a code letter. At least one indicator or triangular marker 116 is superimposed on each street or road, the letter code designation for the street or road appearing within the marker. The marker is placed as close as practical to the point at which the street or road numbering begins. The vertex of the marker points in the direction of ascending street or road numbers. Pick marks 120, 120 are placed along the street pointing in the direction of ascending house numbering and spaced to indicate house numbers along the street or road at designated intervals to further aid in the location of a particular destination. The name of each street is also preferably imprinted on the slide 16 near the street and in a color corresponding to the color of the filter 78. Preferably, and as shown, the street names are imprinted in parallel relation to each other.

In using the viewer 10 to dispatch a utility worker to a predetermined designated location, the worker first inserts an information source, such as the slide 16 to the viewer slot 46. The pointer assembly 24 may be inserted into the slot 52 after which the pointer may be generally positioned in accordance with specific dispatching instructions and with reference to indicia on the pointer assembly, which serves to orient the points 110 and 114 relative to a designated starting point and destination on the map 16. When the map is then viewed through the lens 74 the pointer 112 will appear as a shadow on the map with the points 110 and 114 respectively indicating positions on the map which may, for example, correspond to the worker's starting point and desired destination. If desired, the filter 78 may be placed in its active position in the lens system to filter out extraneous material, such as street names. The worker may then plan the most direct route to his destination without reference to such extraneous material. Assuming that the worker's destination is to be within the mapped section designated by the coordinates E-6 when the worker arrives at the general vicinity of his destination he may wish to further refer to map detail to locate a specific house number or the like. Assuming that the destination is to be on Plesant Drive appropriate dispatching instructions will advise him to proceed to E-6-K, K being the code designation for Plesant Drive. A more detailed view of map section E-6 may be obtained by positioning the lens system 14 at E-6 relative to the viewer 10 and moving the lens 76 to its active position to shorten the focal length of the lens system. The map section is then brought into focus by adjusting the knobs 86, 86 associated with the rack and pinion mechanism 29, to move the information source 16 toward the lens system 14. The color filter 78 may then be shifted to its inactive position to reveal further detailed information on the slide 16. Further information not shown on the slide 16, but carried by the filmstrip 18 may be viewed by advancing the filmstrip to bring desired corelated material imprinted thereon to general registry with the slide 16. This is accomplished by pinching the finger grips 96, 96 on an appropriate cartridge 88 or 88' which releases the cartridge from the viewer housing and, at the same time, pinches the filmstrip 18 within its associated cartridge slot 90 so that the filmstrip may be advanced relative to the housing when the cartridge is moved transversely of the housing. The spring detent 100 cooperates with apertures 98, 98 in the filmstrip 18 to aid in registering the strip relative to the slide 16. When the strip has been properly positioned the viewer may be further focused to bring the filmstrip within the focal plane of the lens system 14. The filmstrip 18 may then be viewed through the slide 16 which will be out of focus. Thus, further information, such as the location of a particular utility service, such as a water main, transformer or the like on the slide 16 may be obtained without reference to extraneous detail.

If the images on both information sources are imprinted so as to be nontransparent, as one of the nontransparent images is brought into focus the second image, either in front or behind it goes out of focus. A slight blurring of the in-focus image will occur due to the light-blocking effect of the out-of-focus image. In accordance with the present invention this problem's overcome by using information sources having images imprinted thereon and different translucent additive colors, so that when one image is viewed through the other the colors which have an additive effect, produce a darker image or magenta. Thus, for example, assume that the images on the slide 16 are imprinted in translucent red whereas the images on the more distant filmstrip 18 are imprinted in translucent blue. When the red image is out of focus, the blue image, in focus, is made clearer to view by the darkening effect of the red image through which an associated portion of the blue image is viewed. Thus, a filter such as 78 may be utilized to filter out extraneous material or to darken either image, as required, by using a filter of appropriate color.

Referring now to FIGS. 17–28, another viewer embodying the present invention is indicated generally by the numeral 130. The viewer 130 is of relatively simple construction and particularly suitable for use as a toy or teaching aid. It has a housing 132 preferably molded from a suitable plastic material and includes a rear part 134 and a front part 136 telescopically received within the rear part. The front part carries a lens 138 and is adjustable relative to the rear part for selectively viewing information sources 140 and 142 supported in slots in the rear housing part 134 in spaced relation to each other along the optical axis or line of sight of the lens 138. The rear wall of the housing 132 is formed by a translucent or frosted plate 144 to admit light into the housing whereby to permit selective viewing of data on either of the information sources 140 and 142 which, as shown, comprise transparent film slides.

When the front part 136 is in its first or full line position as it appears in FIG. 18, the slide 140 is disposed within the field of focus of the lens 138 and may be viewed through the lens to the exclusion of data on the slide 142. However, when the front part 136 is moved rearwardly to its second or broken line position relative to the rear part 134 the transparent slide 142 is disposed within the field of focus of the lens 138 and may be viewed through the generally transparent slide 140 which is then outside of the field of focus of the lens 138.

Figure 22:
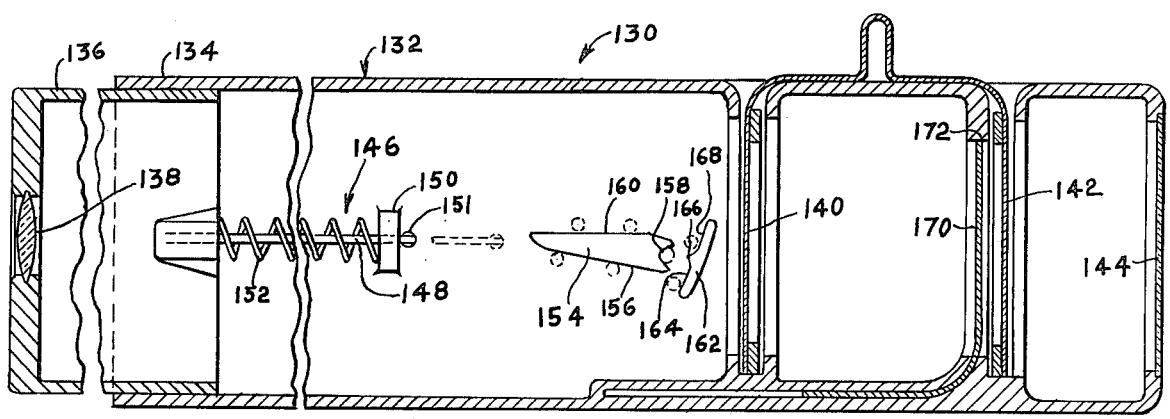
FIG. 22 is a sectional view taken along the lines 22—22 of FIG. 21.
Figure 21:
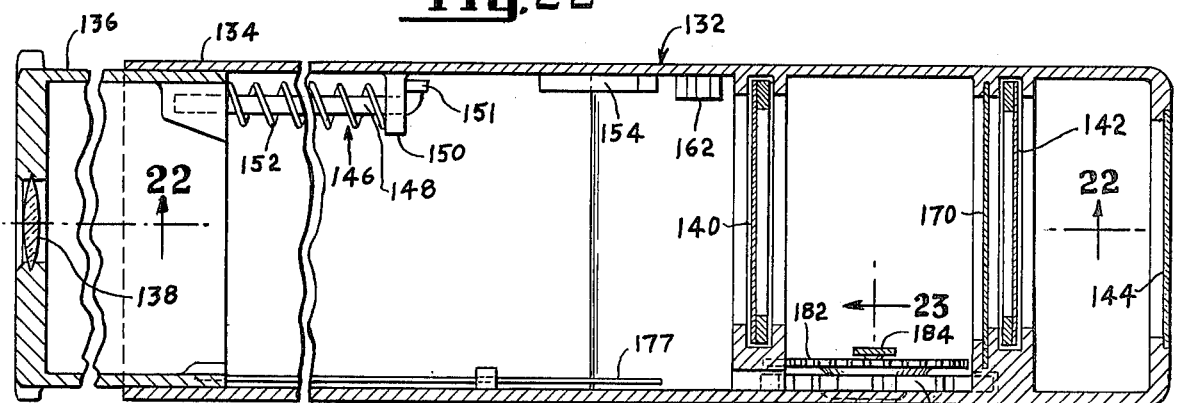
FIG. 21 is a somewhat enlarged sectional view of the viewer taken along the lines 21—21 of FIG. 18.

Preferably, and as shown in FIGS. 21 and 22 the viewer 132 is provided with a novel latching mechanism for releasably retaining the housing front part 136 in one of its two positions of adjustment relative to the rear part 134. The illustrated latching mechanism indicated generally at 146 comprises an elongated, resilient, flexible rod 148 connected in fixed position to the front part 136 and which extends rearwardly therefrom in close relation to one side wall of the rear part 134, as best shown in FIG. 21. The rod 148 passes through a boss 150 mounted in fixed position on the rear part 134 and has an offset generally L shaped free end portion 151. A spring 152 acts between the boss 150 and the front part 136 to bias the housing front part toward its first position. The latching mechanism further includes a latch cam 154 mounted on the rear part 134. The cam 154 is located rearwardly of the rod 148 when the rod is in its first position and has a lower cam surface 156 in the path of the rod end 151 and inclined downwardly and rearwardly relative to the longitudinal axis of the rod. The cam surface 156 terminates at a rearwardly opening rod retaining recess 158. An upper cam surface 160 formed on the latch cam 154 is forwardly and upwardly inclined from the upper end of the rod retaining recess 158. The latching mechanism 146 also includes an abuttment cam 162 mounted on the rear part 134 rearward of the latch cam 154 for arresting rearward movement of the rod 148 and controlling the movement of its end portion as will be hereinafter further discussed. The abuttment cam has a forwarding facing cam surface which includes a lower portion 164 in the path of rearward travel of the rod and inclined rearwardly and upwardly to a generally central deflecting portion 166 which projects forwardly toward the recess 158. A cam surface upper portion 168 is rearwardly and upwardly inclined from the deflecting portion 166, substantially as shown in FIG. 22.

As previously noted, the viewer 132 is particularly adapted for use as a teaching aid. Thus, for example, one of the information sources, such as the slide 140, may have a plurality of questions imprinted thereon whereas the other information source or slide 142 may carry the answers to the latter questions. The viewer 130 may also include a movable curtain 170 to facilitate selective viewing of only a portion of one slide, such as the slide 142, so that answers to selected questions may be viewed to the exclusion of other answers to questions not yet considered. The curtain 170 is supported in a track formed by opposing grooves in opposite sides of the rear part 134 and best shown in FIG. 21 and is arranged to move in close proximity to the slide 142 for obscuring at least a portion of the slide. Preferably, the curtain is made from translucent material, such as flexible frosted plastic sheet material, to permit passage of light therethrough. It is further arranged for incremental movement across the face of the slide 142 to sequentially expose selected portions of the slide above the upper edge of the curtain, the latter edge being indicated at 172.

Figures 25, 26, 28:
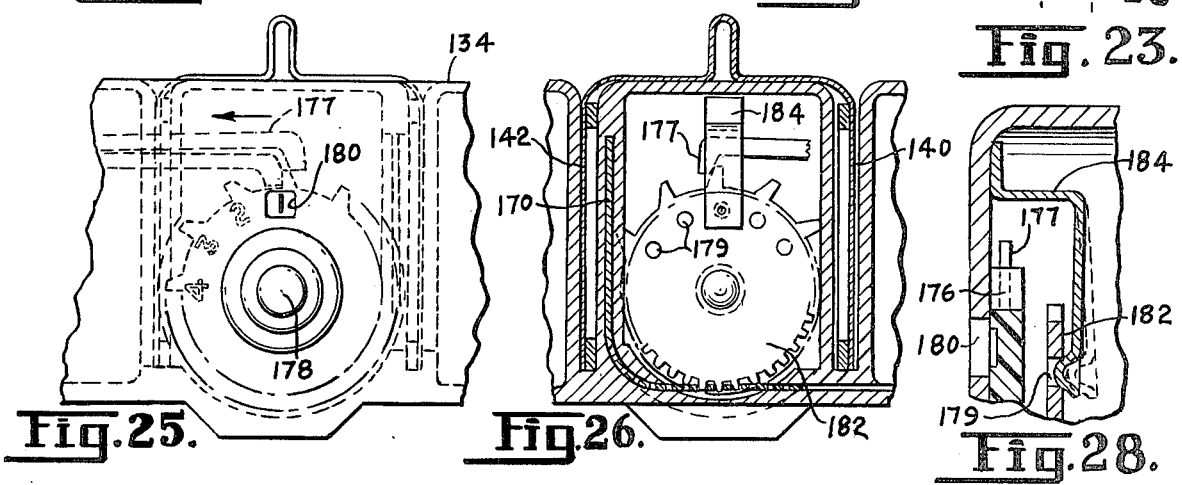
FIG. 25 is a fragmentary side elevational view of the viewer of FIG. 17.
FIG. 26 is a fragmentary sectional view taken along the lines 26—26 of FIG. 23.
FIG. 28 is a fragmentary sectional view taken along the lines 28—28 of FIG. 26.

Movement of the curtain 170 relative to the slide 142 is controlled by a ratchet and pawl mechanism indicated generally at 174 and best shown in FIGS. 23-26. The latter mechanism includes a ratchet wheel 176 journaled for rotation on the rear part 134 and an elongated flexible resilient pawl 177 carried by the front part 136. The ratchet wheel has an integral dial portion 178 which extends through the side wall of the housing rear part 134 and a circumaxial series of detent recesses 179, 179. Numerical increments imprinted on the ratchet wheel comprise a counting means and are arranged for sequential exposure in a window opening 180 in the housing rear part 134 as best shown in FIGS. 17 and 25. The ratchet and pawl mechanism 174 further includes a sprocket wheel 182 connected to and driven by the ratchet wheel 176. Peripheral teeth on the sprocket wheel 182 engage sprocket openings in an associated marginal portion of the curtain 170 to drive the curtain in response to rotation of the sprocket wheel. A detent spring 184 supported on the rear part 134 successively engages the detent recesses 179, 179 to prevent retrograde movement of the curtain 170 each time the sprocket wheel is advanced one increment by rearward movement of the pawl 177 in response to movement of the front part 136 from its first to its second position.

The viewer is initially placed in its first position with a pair of slides 140 and 142 positioned therein, as shown in FIG. 18. When the viewer is in its first position the slide 140 is within the field of focus of the lens 138 and may be viewed to the exclusion of the slide 142. The slide 140 is illuminated by light which enters the housing through the frosted plate 144 and passes through the transparent slide 142 and the translucent curtain 172. Thus, for example, a question imprinted on a portion of the slide 140 may be considered to the exclusion of the answer to the question which may appear on an associated portion of the slide 142. To view the answer the front part 136 is moved rearwardly to its second position against the biasing force of the spring 152. This rearward movement of the front part 136 causes the rod end portion 151 to engage the lower cam surface 156 and be deflected downwardly and generally along the path indicated by the broken line position indicated in FIG. 22. When the rod end portion 151 clears the cam surface 156 and engages the abutment cam 162 it is biased upwardly by its own resilience and generally along the cam surface 164 and into engagement with the deflecting portion 168. The latter portion deflects the resilient rod end toward the retaining notch 158. When the rod end portion 151 engages the deflecting portion resistance to the further rearward movement of the front part 136 is encountered. Upon release of the front part, the biasing spring 152 urges the front part in a forward direction until the rod end portion 151 is fully seated in the notch 158. Thus, the rod end portion 151 cooperates with the notch 158 to releasably retain the viewer in its second position.

Figures 23, 24, 27:
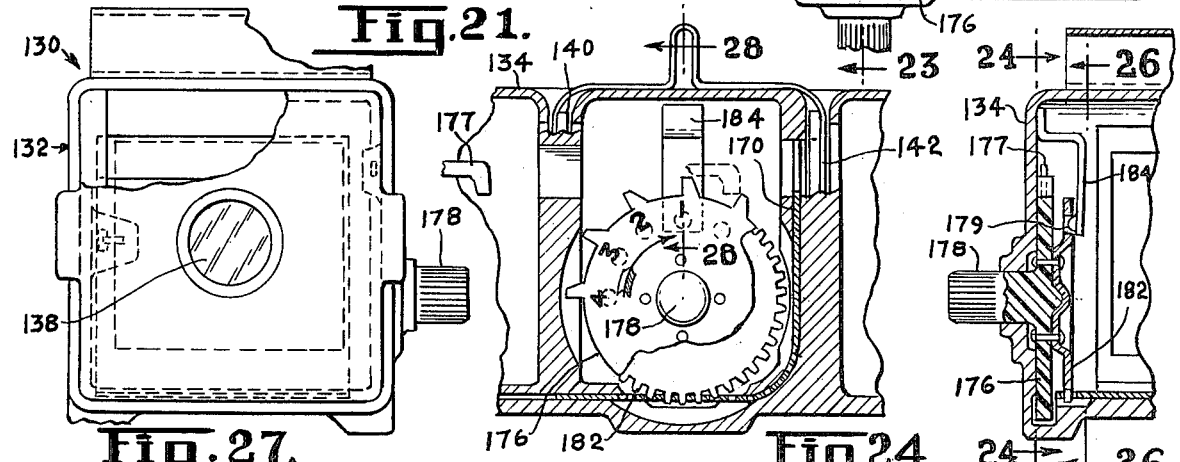
FIG. 23 is a fragmentary sectional view taken along the lines 23—23 of FIG. 21.
FIG. 24 is a fragmentary sectional view taken along the lines 24—24 of FIG. 23.
FIG. 27 is a front view of the viewer of FIG. 17.

When the front part 136 is moved from its first to its second position the pawl 177 engages an associated tooth on the ratchet wheel 176, during a final portion of its rearward travel, to rotate the latter wheel one increment in a clockwise direction, as viewed in FIG. 24. This ratchet movement causes the curtain 170 to move downwardly across the face of the slide 142 to expose an associated portion of the slide and an answer to a corresponding question on slide 140. The latter answer may now be viewed through the lens 138 to the exclusion of the question on the slide 140. The numeral exposed in the window opening 180 indicates the position of the curtain 170 and may, for example indicate the number of the answer in viewing position when the viewer is in its second position. The curtain may be lowered while the viewer is in either of its positions, and without moving the front part 136, by manually rotating the dial portion 178 in a clockwise direction, as oriented in FIGS. 17, 24 and 25.

The front part 136 is released from its second position by applying a slight rearwardly directed force thereto to move the end portion 151 rearwardly out of the notch 158 and into engagement with the deflecting portion 166 which deflects the rod end portion 151 upwardly to a position of general alignment with the upper cam surface 160. Upon release of the front part the biasing spring 152 urges it in a forward direction causing the rod end portion 151 to engage the upper cam surface 160 and travel therealong, as indicated by its broken lines positions in FIG. 22, to return to its first position. Thus, the latching mechanism 146 for releasably retaining the viewer in its second position may be characterized as a push to engage and push to release type mechanism.

The curtain 170 may be raised from a partially lowered position to a fully raised position when the viewer 130 is in its first position, to prepare the viewer to receive another pair of slides. When the viewer is in its first position the pawl 177 is forward of and out of engagement with the ratchet wheel 176. The ratchet wheel may then be rotated in a counterclockwise direction, as oriented in FIGS. 17, 24 and 25, against the holding force of the detent spring 184, by manually rotating the dial portion 178.

When the pair of connected slides 140 and 142 are not in use they way be stored with the slides in adjacent relation as indicated by broken lines in FIG. 20. This storage arrangement facilitates convenient handling and prevents separation of related slide pairs.

While the viewer 130 has been illustrated as it may be used as a teaching aid, it will be apparent that the device of the present invention lends itself to other uses and may, for example, be used as a toy or a game device, and such uses are contemplated within the scope of the invention.

I claim:

1. The combination comprising a viewer and at least two translucent information sources for positioning in said viewer, each of said information sources having data imprinted thereon and related to data imprinted on the other of said information sources, at least one of said information sources comprising a transparency, one of said information sources having data imprinted thereon in one translucent color and another of said information sources having information imprinted thereon in another translucent color, said one color and said other color being additive colors, said viewer having a housing, lens means supported on said housing, means for selective focusing said lens means on each of at least two focal planes located serially along the optical axis of said lens means and within said housing, one of said focal planes being located between said lens means and the other of said focal planes, said one focal plane being outside of the field of focus of said lens means when said lens means is focused on said other focal plane, means for supporting said one information source in said one focal plane, means for supporting said other information source in said other focal plane, and means for illuminating said information sources whereby data thereon may be viewed through said lens means.

2. The combination set forth in claim 1 wherein said viewer includes a pointer assembly having a pointer and means for receiving and supporting said pointer assembly in at least one position within said housing for rotation about an axis normal to said focal planes and in close proximity to an associated one of said focal planes, said pointer being supported for rotation about a pointer axis spaced radially outwardly from the axis of said pointer assembly generally within the field of focus of said lens means when said lens means is focused on said associated focal plane.

3. The combination set forth in claim 2 wherein said pointer assembly axis comprises said optical axis.

4. The combination as set forth in claim 2 wherein said pointer includes two parts movable relative to each other, one of said parts having one indicia of poisition thereon and the other of said parts having another indicia of position thereon.

5. The combination as set forth in claim 2 wherein said pointer assembly comprises a transparent disc and said pointer is supported on said disc for limited pivotal movement about said pointer axis.

6. The combination as set forth in claim 5 wherein said pointer is supported on said disc for movement relative to said disc and in a radial direction relative to said pointer axis.

7. The combination as set forth in claim 1 wherein said viewer includes at least one color filter movable between active and inactive positions relative to said lens means.

8. The combination as set forth in claim 7 wherein the color of said color filter comprises said one color.

9. A device for selectively viewing a plurality of information sources having date imprinted thereon, said device having a housing, means for supporting said information sources in said housing, lens means, means supporting said lens means on said housing for positioning relative to said information sources to focus on a selected one of said information sources, a pointer assembly having a pointer, means supporting said pointer assembly in said housing a close proximity to said selected information source for rotation about an axis normal to a focal plane containing said selected information source, said pointer supported for limited rotation about a pointer axis spaced radially outwardly from the axis of said pointer assembly, and means for illuminating said information sources whereby data thereon may be viewed through said lens means.

10. A viewing device as set forth in claim 9 wherein said pointer assembly comprises a transparent disc, said pointer assembly comprises the central axis of said disc, and said pointer is supported on said disc.

11. A viewing device as set forth in claim 10 wherein said pointer includes two parts movable relative to each other, one of said parts having one indicia of position thereon and the other of said parts having another indicia of position thereon.

12. A device for selectively viewing a plurality of information sources having data imprinted thereon, said device having a housing, means for supporting said information sources within said housing, lens means, means supporting said lens means on said housing for positioning relative to a selected one of said information sources to focus thereon, means for illuminating said selected information source, means for obscuring from view through said lens means at least a portion of one of said information sources, and means for moving said obscuring means relative to said one information source to vary the portion of said one information source obscured from view through said lens means in response to positioning of said lens means.

13. The combination as set forth in claim 12 wherein said means for moving said obscuring means comprises means for incrementally moving said obscuring means relative to said one information source to sequentially expose to view through said lens means additional incremental portions of said one information source in response to sequential positioning of said lens means.

14. The combination as set forth in claim 13 wherein said means for incrementally moving said obscuring means comprises a ratchet and pawl mechanism.

15. The combination as set forth in claim 13 wherein said obscuring means comprises a curtain supported in a track defined by opposing grooves formed in opposite walls of said housing and arranged for movement in close proximity to said selected information source.

16. The combination as set forth in claim 15 wherein said curtain comprises a flexible sheet of translucent material.

17. The combination as set forth in claim 14 including counting means for numerically indicating the incremental movement of said obscuring means relative to said selected information source.

18. The combination as set forth in claim 12 wherein said means supporting said lens means is further characterized as means supporting said lens means for selective focusing on each of at least two focal planes located serially along the optical axis of said lens means and within said housing, one of said focal planes being located between said lens means and the other of said focal planes, said one focal plane being outside of the field of focus of said lens means when said lens means is focused on said other focal plane, means for supporting one of said information sources in said one focal plane, and means for supporting another of said information sources in said other focal plane.

19. The combination as set forth in claim 18 wherein said housing comprises a plurality of relatively movable parts, said lens means is carried by one of said parts, and said information sources are carried by another of said parts.

20. The combination as set forth in claim 19 wherein said device includes means normally biasing said one part to one position wherein said lens means is focused on one of said focal planes.

21. The combination as set forth in claim 20 wherein said viewer includes means for releasably retaining said one part in another position wherein said lens means is focused on another of said focal planes.

22. The combination as set forth in claim 21 wherein said retaining means comprises latching means for releasably retaining said one part in said other position in response to movement of said one part from said one position in the direction of said other position to a further position beyond said other position upon release of said front part at said further position.

23. A device for selectively viewing a plurality of information sources having data imprinted thereon and including at least one resilient translucent strip having a plurality of serially connected frames each defining one information source, said device comprising a housing, catridge means releasably engageable with said housing for supporting said strip relative to said housing and for selectively positioning said information sources within said housing, said cartridge means comprising a cartridge assembly including a pair of cartridge members, each of said cartridge members having a generally cylindrical chamber for receiving a resiliently coiled end portion of said strip and a slot communicating with said chamber and through which said strip passes, each of said cartridge members having an integral locking tab thereon and a locking recess formed therein, the locking tab on each of said cartridge members being received in the locking recess in the other of said cartridge members to releasably retain said cartridges in assembly with each other when said cartridge members are released from engagement with said housing and assembled with each other, said cartridge members in assembly with each other forming a substantially closed container for housing said strip.

24. The combination as set forth in claim 23 wherein said housing has a pair of side walls and each of said side walls has a retaining tab for complementary interlocking engagement within said locking recess of an associated one of said cartridge members and a retaining recess for receiving and substantially complementing an associated portion of said locking tab on said one cartridge member.

25. The combination as set forth in claim 24 wherein said cartridge member comprise a pair of substantially identical cartridge members.

26. The combination as set forth in claim 23 wherein each one of said cartridge members is made from resilient plastic material, said slot is defined by opposing slot side walls of said one cartridge member, and said one cartridge member is released from engagement with said housing and said slot side walls are simultaneously biased into gripping engagement with an associated portion of said strip by application of squeezing pressure to opposite side of said one cartridge member to selectively position said information sources within said housing by movement of said one cartridge member relative to said housing while said squeezing pressure is simultaneously applied thereto.

* * * * *